US011802781B2

(12) United States Patent
Rufer et al.

(10) Patent No.: US 11,802,781 B2
(45) Date of Patent: Oct. 31, 2023

(54) MAGNETIC-INDUCTIVE FLOWMETER HAVING ELECTRODE INCLUDING A PRESSURE SENSOR AND A TEMPERATURE SENSOR

(71) Applicant: Endress+Hauser Flowtec AG, Reinach (CH)

(72) Inventors: Heinz Rufer, Dornach (CH); Frank Voigt, Weil am Rhein (DE); Steffen Ziegler, Schopfheim (DE)

(73) Assignee: Endress+Hauser Flowtec AG, Reinach (CH)

( * ) Notice: Subject to any disclaimer, the term of this patent is extended or adjusted under 35 U.S.C. 154(b) by 244 days.

(21) Appl. No.: 17/299,527

(22) PCT Filed: Nov. 11, 2019

(86) PCT No.: PCT/EP2019/080800
§ 371 (c)(1),
(2) Date: Jun. 3, 2021

(87) PCT Pub. No.: WO2020/114717
PCT Pub. Date: Jun. 11, 2020

(65) Prior Publication Data
US 2022/0026250 A1    Jan. 27, 2022

(30) Foreign Application Priority Data

Dec. 4, 2018    (DE) ..................... 10 2018 130 793.4

(51) Int. Cl.
*G01F 1/58*    (2006.01)
*G01F 25/10*   (2022.01)

(52) U.S. Cl.
CPC .............. *G01F 1/588* (2013.01); *G01F 25/10* (2022.01)

(58) Field of Classification Search
None
See application file for complete search history.

(56) References Cited

U.S. PATENT DOCUMENTS 5,670,724 A    9/1997  Batey
6,598,487 B1 *  7/2003  Marsh ................ G01F 1/584
                                              73/861.11

(Continued)

FOREIGN PATENT DOCUMENTS

CN    201107058 Y    8/2008
CN    202734880 U    2/2013

(Continued)

*Primary Examiner* — Harshad R Patel
(74) *Attorney, Agent, or Firm* — Christopher R. Powers; Endress+Hauser (USA) Holding, Inc.

(57) ABSTRACT

A magnetic-inductive flowmeter for ascertaining flow velocity and/or volume flow of a medium includes a measuring tube for conveying the medium, a magnetic field producing apparatus and at least one electrode assembly, which is installed in the measuring tube such that it forms a galvanic contact with the medium, wherein the electrode assembly has an electrode body, wherein the electrode body is stylus-shaped and has a front end surface, characterized in that a pressure measuring transducer is coupled with the electrode body, wherein the pressure measuring transducer is contactable with the pressure acting on the front end surface, and the electrode assembly includes a temperature sensor, which is adapted to ascertain a measurement signal dependent on temperature of the medium.

17 Claims, 4 Drawing Sheets

(56) References Cited

U.S. PATENT DOCUMENTS

| | | | |
|---|---|---|---|
| 2009/0205438 A1* | 8/2009 | Budmiger | G01F 1/58 73/861.12 |
| 2010/0077865 A1 | 4/2010 | Rackebrandt et al. | |
| 2015/0377666 A1 | 12/2015 | Rovner et al. | |
| 2022/0074769 A1* | 3/2022 | Rufer | G01F 1/588 |

FOREIGN PATENT DOCUMENTS

| | | |
|---|---|---|
| CN | 104685323 A | 6/2015 |
| CN | 204439144 U | 7/2015 |
| DE | 102007005670 A1 | 8/2008 |
| DE | 102007024006 A1 | 11/2008 |
| DE | 102010029119 A1 | 11/2011 |
| DE | 102012109308 A1 | 4/2014 |
| DE | 102013109993 A1 | 3/2015 |
| EP | 0770855 A1 | 5/1997 |
| EP | 1522827 A1 | 4/2005 |
| JP | 5692414 A | 7/1981 |
| WO | 2015036187 A2 | 3/2015 |

\* cited by examiner

MAGNETIC-INDUCTIVE FLOWMETER HAVING ELECTRODE INCLUDING A PRESSURE SENSOR AND A TEMPERATURE SENSOR

CROSS-REFERENCE TO RELATED APPLICATIONS

The present application is related to and claims the priority benefit of German Patent Application No. 10 2018 130 793.4, filed on Dec. 4, 2018, and International Patent Application No. PCT/EP2019/080800, filed on Nov. 11, 2019, the entire contents of which are incorporated herein by reference.

TECHNICAL FIELD

The present disclosure relates to magnetic-inductive flowmeters, particularly a magnetic-inductive flowmeter incorporating other sensors.

BACKGROUND

Magnetic-inductive flowmeters are applied for determining flow velocity and/or volume flow of a medium in a measuring tube. A magnetic-inductive flowmeter includes a magnetic field producing means, which produces a magnetic field extending perpendicularly to the transverse axis of the measuring tube. Used for such purpose are usually one or more coils. In order to implement a predominantly uniform magnetic field, pole shoes are supplementally so formed and placed such that the magnetic field lines extend over the total tube cross-section essentially perpendicularly to the transverse axis. A measuring electrode pair applied at the lateral surface of the measuring tube senses an inductively produced electrical measurement voltage, which arises, when a conductive medium flows in the direction of the longitudinal axis in the presence of applied magnetic field. Since the registered measurement voltage depends according to Faraday's law of induction on the velocity of the flowing medium, flow velocity can be ascertained from the measured voltage and, with incorporation a known tube cross-sectional area, the volume flow of the medium can also be ascertained.

For special applications involving monitoring for irregularities and leakage locations, information relative to the pressure of the medium is desired supplementally to the volume flow.

Known from EP0770855A1 is a magnetic-inductive flowmeter, which has besides measuring electrodes for ascertaining flow velocity two pressure measuring transducers, which are arranged in the wall of the measuring tube along a surface element.

U.S. Pat. No. 5,670,724 teaches a flowmeter having a measuring electrode pair and a pressure measuring transducer arranged directly between the two measuring electrodes.

Known from DE102012109308A1 is a fill level monitoring system having an electrode for monitoring the fill level of a flowing medium in a tube and having an integrated temperature sensor.

However, disadvantageous with these proposals is that an extra opening must be provided in the measuring tube for installation of a pressure measuring transducer and/or temperature sensor. Each additional opening is a potential location of leakage and should, thus, be avoided as much as possible.

SUMMARY

An object of the invention is to provide a magnetic-inductive flowmeter, which can measure temperature and pressure of the flowing medium.

The object is achieved by the magnetic-inductive flowmeter according to the present disclosure.

A magnetic-inductive flowmeter of the invention for ascertaining flow velocity and/or volume flow of a medium includes: a measuring tube for conveying the medium, a magnetic field producing means and at least one electrode assembly, which is installed in the measuring tube in such a manner that it forms a galvanic contact with the medium, wherein the electrode assembly has an electrode body, wherein the electrode body is stylus-shaped and has a front end surface, wherein the flowmeter is characterized in that a pressure measuring transducer is coupled with the electrode body, wherein the pressure measuring transducer is contactable with pressure acting on the front end surface, and the electrode assembly includes a temperature sensor, which is adapted to ascertain a measurement signal dependent on temperature of the medium.

Previously, pressure measuring transducers introduced additionally into the measuring tube have been necessary for determining the pressure of the medium. Usually this has required extra openings in the measuring tube in addition to the openings needed for the measuring electrodes. The solution of the invention requires no additional openings in the measuring tube, since the pressure of the medium acting on the front end surface of the electrode body is directly sensed via a pressure measuring transducer coupled with the electrode body. In such case, it is especially advantageous that the pressure measuring transducer is in contact with the medium. There are, however, also pressure measuring transducers, which are exposed only indirectly to the medium and, thus, also only indirectly to the pressure of the medium. This is the case, for example, when air is present between the pressure measuring transducer and the medium.

The electrode assembly is an electrode forming assembly of at least two components, wherein at least a first component has the function and is embodied to sense a measurement voltage in the flowing medium and at least a second component has the function and is embodied to measure the pressure in the medium. The electrode assembly can also include components, which have the function and are adapted to determine other process parameters of the medium, such as, for example, the temperature, the viscosity and the pH value.

It is especially advantageous that the first component comprises an electrode body. In this context, the electrode body is an electrode known from conventional, magnetic-inductive flowmeters. Such are usually embodied stylus-shaped and can, thus, be installed and secured simply in the measuring tube. They have an electrode head with a front end surface, on which the pressure of the medium acts.

The second component is embodied as a pressure measuring transducer. According to the invention, the pressure measuring transducer is coupled to the electrode body. This means, on the one hand, that the pressure measuring transducer is mechanically connected with the electrode body either directly or indirectly via another component. On the other hand, this can mean that the pressure measuring transducer is in electrical contact with the electrode body. A coupling between the pressure measuring transducer and the electrode body is present, for instance, when the two components are so embodied that the pressure of the medium acting on the front face of the electrode head can load the pressure measuring transducer.

The pressure measuring transducer can be embodied in any way. The pressure measuring transducer can be embodied, for example, as strain gages, as a piezoresistive pressure sensor, as a piezoelectric pressure sensor, as a capacitive pressure sensor, as an inductive pressure sensor, as an optical pressure sensor, as a thermal pressure sensor or as a Hall pressure sensor.

The electrode assembly assumes the function of a fill level monitoring electrode, a reference electrode and/or a measuring electrode.

If the electrode assembly includes a temperature sensor supplementally to the pressure sensor, then another opening in the measuring tube can be omitted. There are two options for ascertaining the temperature of the medium. Either the temperature sensor is applied on the electrode body in direct contact with the medium or it obtains the measurement signal for ascertaining the temperature of the medium indirectly via an electrode component in direct contact with the medium. This component can be the electrode head, the electrode body, the hollow body or the pressure measuring transducer. For example, a temperature of the medium can be sensed via a temperature sensor arranged behind the pressure measuring transducer. When the medium comes in contact with the pressure measuring transducer, heat exchange occurs. This can be detected with the measuring and/or evaluation unit. With the aid of an earlier calibration, a temperature of the medium can be ascertained therefrom.

In an additional embodiment, the pressure measuring transducer includes a measuring membrane.

It is especially advantageous that the pressure measuring transducer include a measuring membrane, since such a pressure measuring transducer is producible with the needed range and a coupling between pressure measuring transducer and electrode body is implementable without any additional adapter. Furthermore, pressure measuring transducers with measuring membranes cover the pressure range of interest for drinking water applications.

In an additional embodiment, the electrode body includes a first bore.

The first bore serves, in such case, for receiving the medium and can be embodied either as a blind bore or as a passageway. In the case of a blind bore, the pressure measuring transducer can be placed at the end of the first bore or, however, also on the inner surface of the first bore. An electrode body with a passageway has an inlet end and an outlet end. In the case of a passageway, the pressure transducer can be placed on the inner surface of the first bore. It is, however, especially advantageous, especially in the case of a pressure measuring transducer having a measuring membrane, when this is mounted at the outlet end.

In an additional embodiment, the first bore is a passageway and forms an integrated pressure supply duct for conveying the medium.

It is especially advantageous when the passageway is a pressure supply duct, since then a plurality of additional embodiments relative to the coupling of the pressure measuring transducer to the electrode body become possible. An advantageous embodiment, includes an adapter applied at the outlet end, via which other measuring transducers for registering process parameters are coupled with the electrode body.

The inside of the first bore can have a coating, which optimizes movement of the medium into the bore and the wetting of the inside of the first bore. The pressure supply duct, or the first bore, does not have to be self-emptying, since pressure measuring transducers can, as is known, also sense the pressure of a medium indirectly.

In an additional embodiment, the electrode body is terminally connected with a hollow body.

The hollow body is adapted to widen the pressure supply duct, so that measuring membranes, whose diameter is greater than the diameter of the first bore, can be used. In this way, the area, on which the pressure of the medium is applied, can be increased and the accuracy of measurement of the pressure measurement improved.

The hollow body can simultaneously be embodied as an adapter for other measuring transducers, wherein the measuring transducer comprises a thermometer, a pH sensor or a sensor for ascertaining viscosity, the composition of the medium and/or other process parameters of the medium.

In an additional embodiment, a housing containing the pressure measuring transducer is connected with the hollow body by material bonding.

It is especially advantageous that the housing be connected with the hollow body by material bonding, especially via a screw, weld, solder or adhesive connection. In this way, an effective electrical connection can be implemented between housing and hollow body. Depending on the production method used for the magnetic-inductive flowmeter of the invention, a shape interlocking connection is provided between the terminal region of the electrode body and the hollow body for the purpose of obtaining an effective sealing. This prevents escape of the medium. Advantageously, the connection is embodied as a shape interlocking connection, since then a replaceability of the individual components is assured. The shape interlocking connection includes, in such case, a sealing ring and, especially, a conical seal. The seal can also be electrically insulating, since the electrical connection with the electrode body is implementable via other contact locations, for example, screw threads.

The connection between the terminal region of the electrode body and the hollow body can, however, also be accomplished by material bonding. In such case, the connection is implemented after introduction of the electrode body into the hole in the measuring tube and securement of the electrode body to the measuring tube.

In an additional embodiment, an electrical contacting of the electrode body is implemented via the hollow body and/or the housing. This is advantageous, since then additional wiring, or an additional contacting apparatus, to the electrode body can be omitted.

In an additional embodiment, the housing includes at least one contacting apparatus, via which the electrode assembly is electrically contacted with a measuring- and/or evaluation unit.

Because of the contacting apparatus in the housing of the pressure measuring transducer, a single plug-in connection suffices for tapping the pressure signal and the measurement voltage.

In an additional embodiment, the magnetic field producing means includes at least one coil and at least one coil core positioned in the interior of the coil, wherein the coil core is embodied as a hollow cylinder and the electrode assembly is positioned in the interior of the coil core.

Magnetic field producing means are known, which comprise besides a coil having a coil core located in the interior supplementally a field-guide material in the outer region and at least one shielding element between a pole shoe and the field-guide material and/or above the field-guide material and the coil. The field-guide material and the shielding elements fulfill the goal of reducing disturbance- or stray fields. In contrast, the pole shoe is responsible for the in-coupling of the magnetic field into the medium. In this advantageous embodiment, the electrode assembly has the function of a fill level monitoring electrode and contains the magnetic field producing apparatus. In such case, measuring of the pressure can occur continuously or intermittently, e.g., when the magnetic field is switched off.

In an additional embodiment, the coil core has an inside, wherein insulation is provided between the inside and the housing.

Since the electrical connection of the electrode body is implemented via the housing of the pressure measuring transducer, an insulation between the electrode assembly and the coil core is necessary. The insulation can be embodied as a coating or as a hollow-cylindrical, insulating sleeve.

In an additional embodiment, the electrode body includes an electrode head, wherein the electrode head has a contour.

The contour is, in such case, embodied to exhibit a slit, which is shaped as a groove or a cross. It can, however, have any other structure, which leads to a simplifying of the mounting of the electrode body in the measuring tube. The contour is embodied in such a way that in the production of the magnetic-inductive flowmeter of the invention a technician can affix the electrode body to the contour, in order then in the next step to push-on the insulating sleeve and secure the electrode body to the measuring tube with a nut.

In an additional embodiment, the electrode body comprises a fill level monitoring electrode and/or a reference electrode and/or a measuring electrode for sensing a measurement voltage in the medium.

In an additional embodiment, the electrode body is embodied as a peg electrode, a pointed electrode or a mushroom electrode.

In an additional embodiment, the electrode body is divided into a first and second region, wherein the electrode body has in the first region a lesser thickness than in the second region, wherein the temperature sensor is mounted in the first region on an outer surface of the electrode body. The temperature sensor can be adhered or mechanically secured to the outer surface of the electrode body.

It is especially advantageous that the temperature sensor be mounted flush to the electrode body. In this way, it is located especially near to the medium flowing through the measuring tube, whereby a significantly more exact detection of temperature changes in the medium is possible. Such is especially advantageous in the case of application behind the pressure measuring transducer or on the hollow body.

In an additional embodiment, the temperature sensor comprises a semiconductor temperature sensor, a thermocouple, a temperature detector with quartz oscillator, a pyroelectric temperature sensor, a pyrometer or a fiber optic temperature sensor.

In an additional embodiment, the electrode head has a measuring tube interior far, rear face, into which a cavity is introduced, wherein the temperature sensor is in the cavity.

Since typically only a small amount of medium is located in the pressure difference supply duct of the electrode body, the temperature sensor is advantageously supplementally in contact with an additional component. Especially advantageously in such case, the additional component is the electrode head, since this is ideally continuously in contact with flowing medium. This is not absolutely the case for the electrode body, since this can also fulfill the function of differential pressure duct for supplying pressure to the pressure measuring transducer with an only partially filled, first bore. Air bubbles or air inclusions are, however, not good heat conductors, such that strong deviations from the actual temperature of the medium can occur. With arrangement of the temperature sensor on the electrode head, such problem is avoided. A groove, or a cavity, in the electrode head assures that the distance between the temperature sensor and the medium sinks further and the temperature sensor can be secured to the electrode head. This is executed without losing sealing of the construction while retaining flow profile specific properties of the electrode head.

In an additional embodiment, the electrode head includes an opening, especially a second bore, to guide a shell containing the temperature sensor.

If the electrode component has the function of a fill level monitoring electrode, then the flow profile resulting from the form of the electrode head plays a lesser role. Thus, there can be an embodiment of the invention, in which the temperature sensor is in direct contact with the medium. For such purpose, the electrode head includes an opening, or a second bore, through which a shell, especially an immersion shell, surrounding a temperature sensor is introduced.

A method for producing a magnetic-inductive flowmeter of the invention includes method steps as follows:
(A) providing a measuring tube comprising a tube with liner;
(B) forming an opening in the tube and liner;
(C) introducing the electrode body containing a thermosensor into the opening;
(F) securing the electrode body by means of a nut;
(G) material bonded connecting of a housing containing a pressure measuring transducer with a hollow body having an internal thread;
(H) screwing the hollow body onto the screw thread of the electrode body;
(J) surrounding the electrode assembly with insulation formed as a hollow cylinder and a coil core formed as a hollow cylinder;
(K) pushing a coil onto the coil core, the insulation and the electrode assembly;
(L) connecting the electrode assembly with a measuring- and/or evaluation unit via a contacting apparatus;
(N) connecting the thermosensor with the measuring- and/or evaluation unit via a connection cable.

The method can further comprise other method steps:
(D) sealing of the opening and/or securing the electrode body by means of an insulating sleeve, wherein the insulating sleeve includes a groove for guiding a connection cable;
(E) securing the electrode body to the contour;
(I) pushing on a pole shoe having an opening; and
(M) pushing on a field-guide material.

The method is, however, not limited to performing individual method steps in the sequence set forth here.

BRIEF DESCRIPTION OF THE DRAWINGS

The invention will now be explained in greater detail based on the appended drawing, the figures of which show as follows.

DETAILED DESCRIPTION

Figure 1:
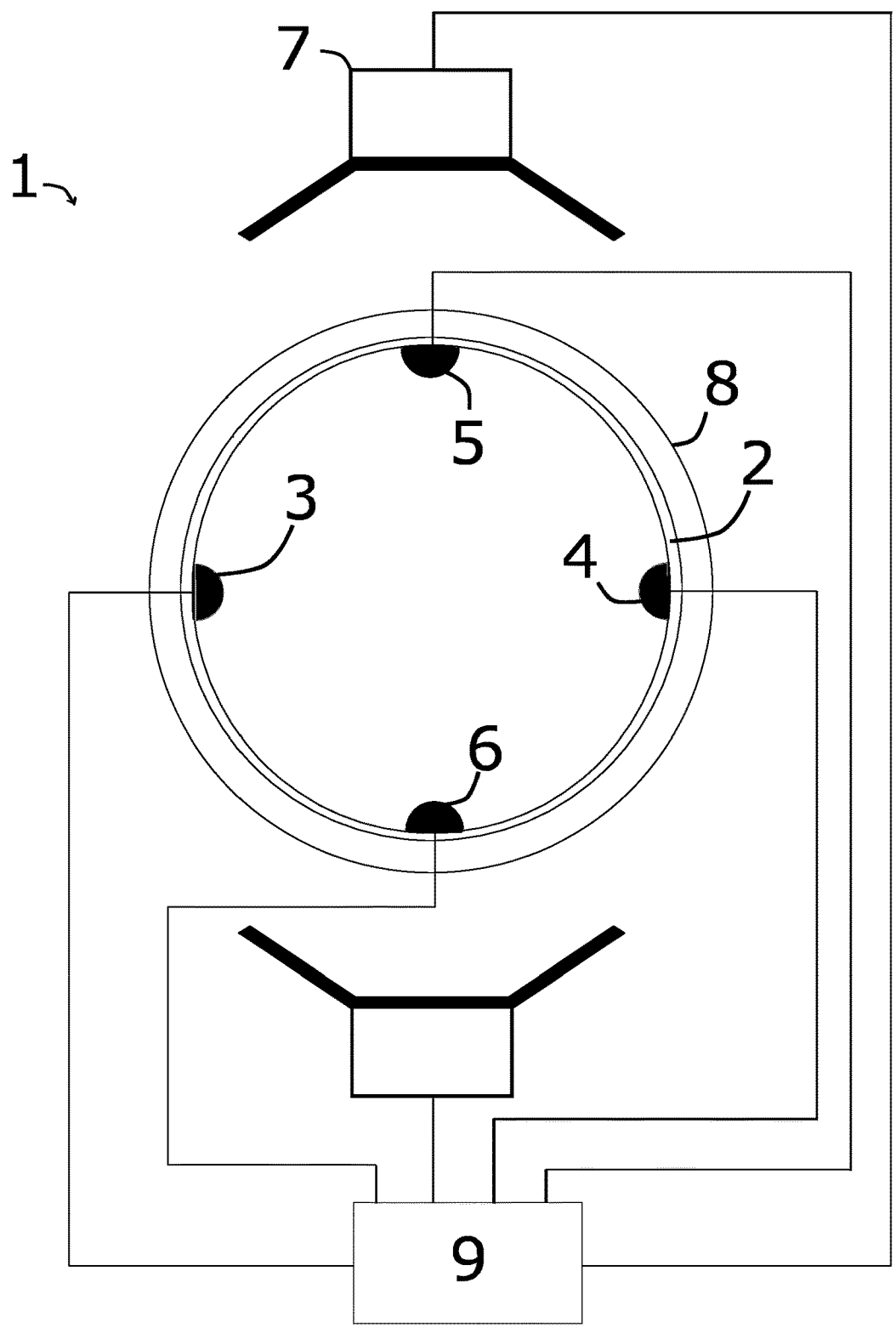
FIG. 1 shows a tube cross-section of a magnetic-inductive flowmeter according to the state of the art.

FIG. 1 shows a conventional magnetic-inductive flowmeter. The construction and the measuring principle of magnetic-inductive flowmeters are basically known. An electrically conductive medium is conveyed through a measuring tube (1). A magnetic field producing means (7) is so arranged that its magnetic field lines extend perpendicularly to a longitudinal direction defined by the measuring tube axis. In the case of applied magnetic field, there arises in the measuring tube (1) a flow dependent potential distribution, which is sensed with two measuring electrodes (3, 4) mounted at the inner surface of the measuring tube (1). As a rule, the electrodes (3, 4) are arranged diametrically opposite one another and form an electrode axis, which extends perpendicularly to the magnetic field lines and to the longitudinal axis of the tube. Based on the measured voltage and taking into consideration the magnetic flux density, flow velocity and the tube cross-sectional area, volume flow of the medium can be determined. In order to avoid short-circuiting of the measurement voltage on the measuring electrodes (3, 4) through the tube (8), the inner surface of the tube (8) is lined with an insulating material, e.g., in the form of a plastic liner (2). The magnetic field produced by a magnetic field producing means, for example, an electromagnet, results from a direct current of alternating polarity clocked by means of an operating unit. This assures a stable zero-point and makes the measuring insensitive to influences resulting from multiphase materials, inhomogeneities in the medium or low conductivity. A measuring unit reads the voltage between the measuring electrodes (3, 4) and outputs flow velocity and/or volume flow of the medium calculated by means of an evaluation unit. Usual magnetic-inductive flowmeters have supplementally to the measuring electrodes (3, 4) two other electrodes (5, 6). On the one hand, a fill level monitoring electrode (5), which is mounted optimally at the highest point in the tube (8) and has only a minimum distance to the tube inner surface, serves to detect a partial filling of the measuring tube (1). This information is forwarded to the user and/or taken into consideration for ascertaining volume flow. Furthermore, a reference electrode (6), which is mounted usually diametrically opposite the fill level monitoring electrode (5), serves to assure a sufficient grounding of the medium.

Figure 2:
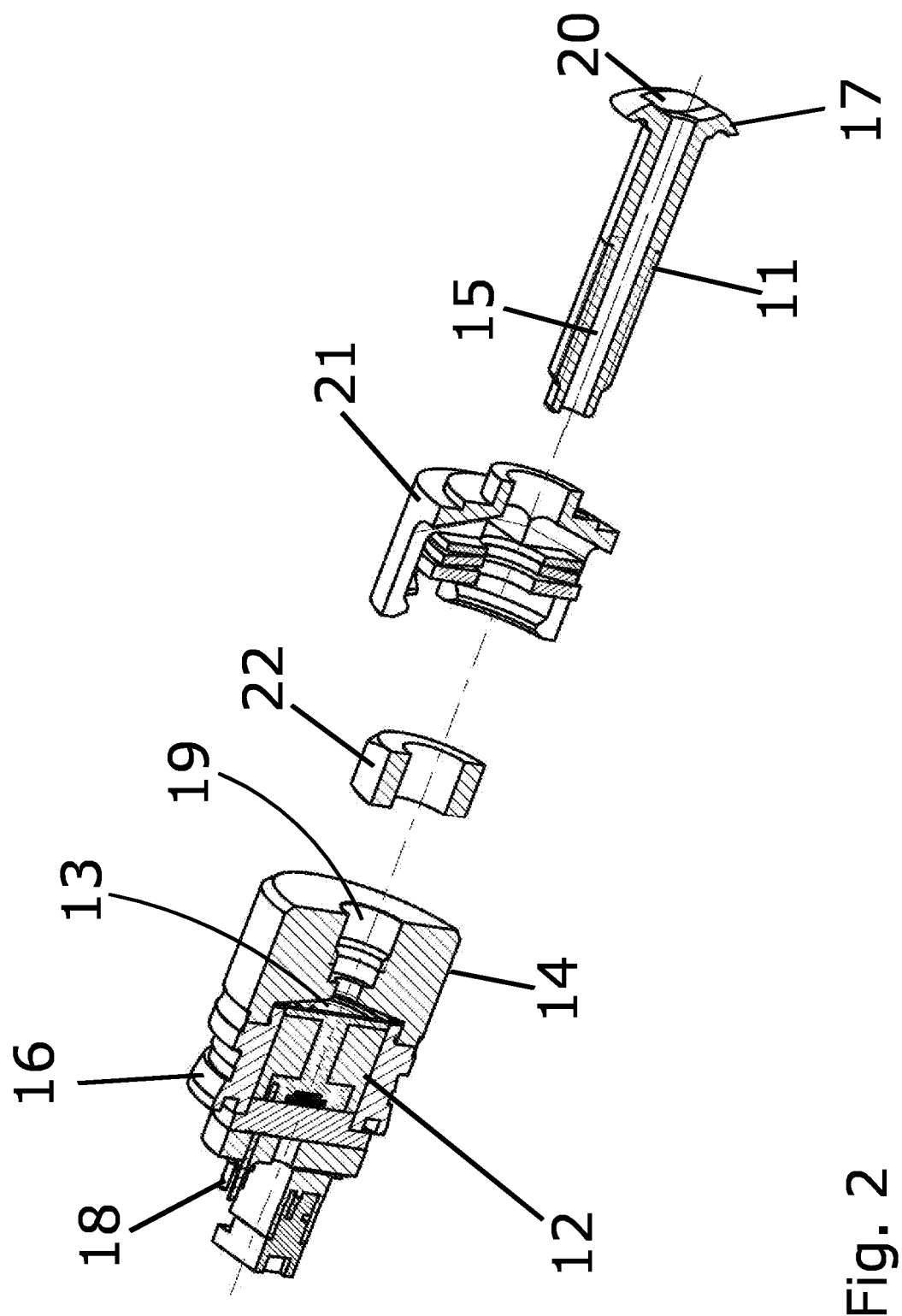
FIG. 2 shows an exploded view of an electrode assembly of the present disclosure.

As shown in FIG. 2, the pressure measuring transducer (12) is a part of the electrode assembly (10), which supplementally comprises at least one electrode body (11). The pressure measuring transducer (12) is, in such case, located in a housing (16), which is conductive and, thus, provides an electrical contact between electrode body (11) and a contacting apparatus (18) mounted terminally on the pressure measuring transducer (12). Thus, the entire electrode assembly (10) is in galvanic contact with the medium. In a further development, a hollow body (14) forms a hollow space (19) between the pressure measuring transducer (12) and the electrode body (11), or the outlet of the first bore (15) embodied as pressure supply duct. Thus, the pressure of the medium acting on the front end surface of the electrode body (11) is led via the pressure supply duct to the measuring membrane (13), where it is detected. Furthermore, the housing (16) is connected by material bonding with the hollow body (14). The electrode body (11) includes an electrode head (17), wherein the electrode head (17) has a contour. The contacting apparatus (18) serves for tapping the pressure of the medium converted into an electrical, or digital, signal for a measuring and/or evaluation unit (9). In such case, the contacting apparatus (18) includes at least one pin, which is in an electrical contact with the housing (16) and, thus, with the electrode body (11). The hollow body (14) is embodied in such a way that it forms, on the one hand, a hollow space (19) between measuring membrane (13) and electrode body (11) and, on the other hand, seals the electrode body (11) in such a manner that the medium flowing through the pressure supply duct cannot escape via the contact area. The electrode body (11) includes an external screw thread, which serves to secure the electrode body (11) to the measuring tube (1) and to connect to the hollow body (14), which has an internal thread.

Figure 3:
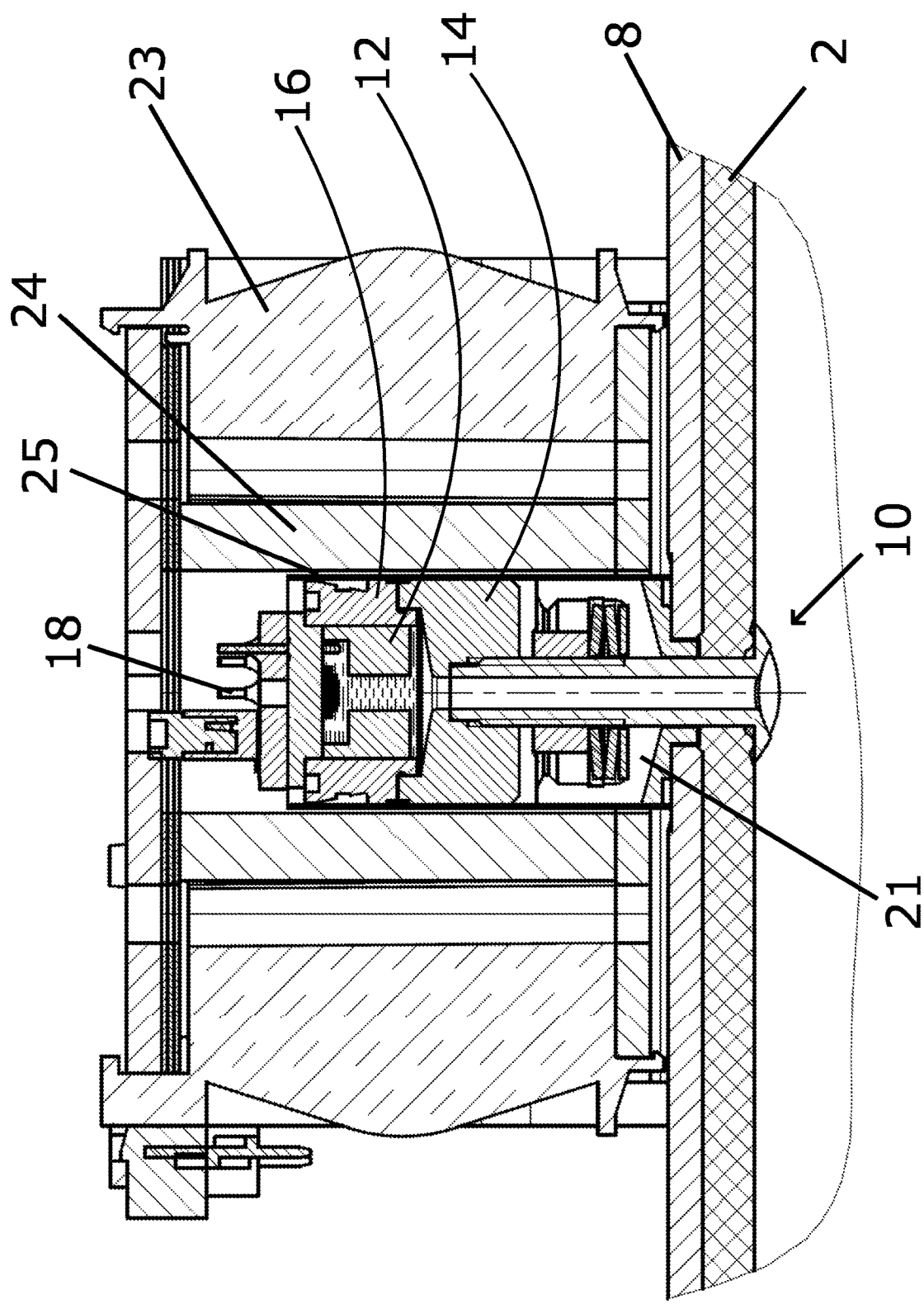
FIG. 3 shows a longitudinal section of a magnetic-inductive flowmeter of the present disclosure.

The magnetic-inductive flowmeter shown in FIG. 3 includes an electrode assembly (10), which comprises a stylus-shaped electrode body (11) having an electrode head (17) having a contour (20), an insulating sleeve (21), a nut (22), a hollow body (14) and a pressure measuring transducer (12). The electrode body (11) includes a screw thread, which serves, on the one hand, for securing the electrode body (11) to the measuring tube (1) with a nut (22), and, on the other hand, for connecting to the hollow body (14) and/or the pressure measuring transducer (12). For mounting the electrode assembly (10) to the measuring tube (1), the electrode body (11) is led through an opening provided in the tube (8) and liner (2) and secured with an insulating sleeve (21) and a nut (22) outside of the tube. The hollow body (14) has an internal thread, such that the hollow body (14) with the shape interlocked pressure measuring transducer (12) can be screwed onto the screw thread of the electrode body (11). The hollow body (14) is embodied to produce a sealed contact to the electrode body (11), so that the medium flowing through the first bore (15) cannot escape at the contact location between the two components. The seal is preferably embodied as a conical seal. The electrode assembly (10) shown in FIG. 3 is embodied as a fill level monitoring electrode (5) and is arranged in the interior of a coil (23), especially in the interior of a coil core (24), of the magnetic field producing means (7). Suited as magnetic field producing means (7) is preferably a saddle coil or a pole shoe (26) with superimposed coil (23) and coil core (24). For this further development, it is necessary to provide the coil core (24) as a hollow cylinder and to insulate the electrode assembly (10) electrically from the magnetic field producing means (7), especially the coil (23) and the coil core (24). The insulation (25) can be implemented by a coating of the inside of the coil core (24) with an electrically insulating material or by the introduction of an electrically insulating, hollow cylinder between the coil core (24) and the electrode assembly (10).

Figure 4:
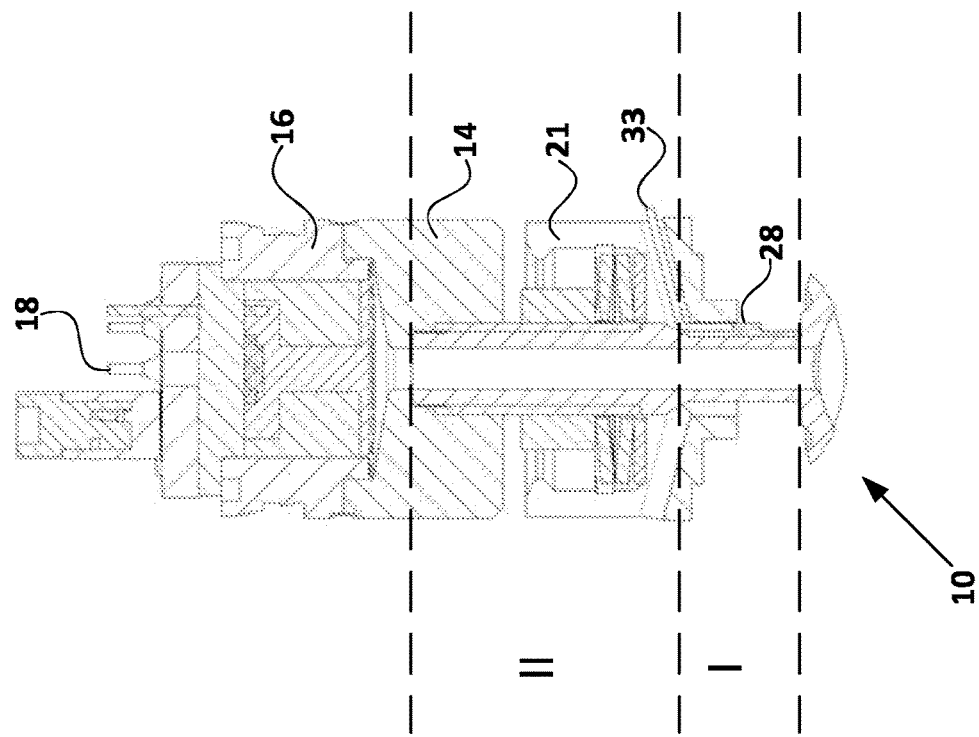
FIG. 4 shows a cross-section of an embodiment of the present disclosure, in which a temperature sensor is mounted flush to the electrode body.

FIG. 4 shows, supplementally to the features shown in FIG. 3, a temperature sensor (28). Such is mounted flush to the electrode body (11). The tip of the temperature sensor (28) supplementally contacts the rear face of the electrode head (17). Furthermore, the electrode body (11) has two regions (I, II) with different thicknesses. The temperature sensor (28) is located in the region (I) with the lesser thickness. Such is mounted flush on the outer surface of the electrode body (11). Furthermore, the electrode body (11) includes a transition, in which the thickness gradually increases from the first region (I) until it reaches the thickness of the second region (II). In this way, a damaging of the electrical connection (33) can be avoided.

Figure 5:
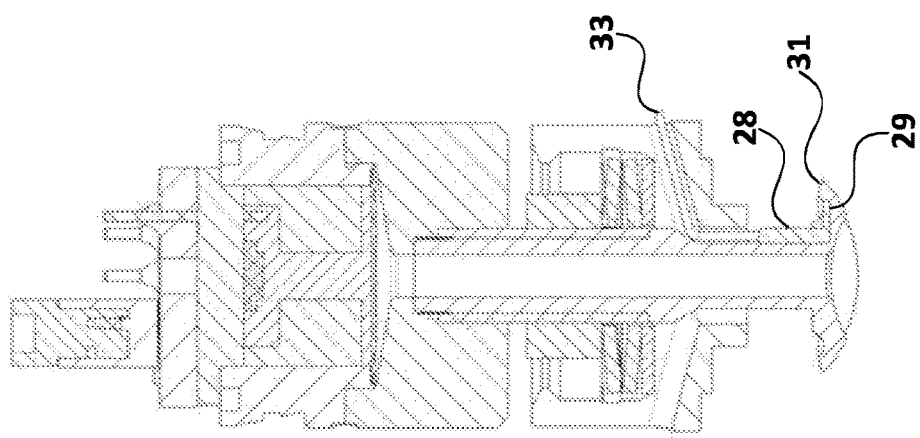
FIG. 5 shows a cross-section of an additional embodiment of the present disclosure, in which the temperature sensor is in a cavity in the electrode head.

The electrode head (17) shown in FIG. 5 includes on the rear face (31) a cavity (29), into which the temperature sensor (28) extends. Thus, the temperature sensor (28) includes a first contact area, which is in contact with the outer surface of the electrode body (11) and a second contact area, which is in contact with the rear face of the electrode head (17). FIG. 5 thus shows the temperature sensor (28) partially extending into the cavity.

Figure 6:
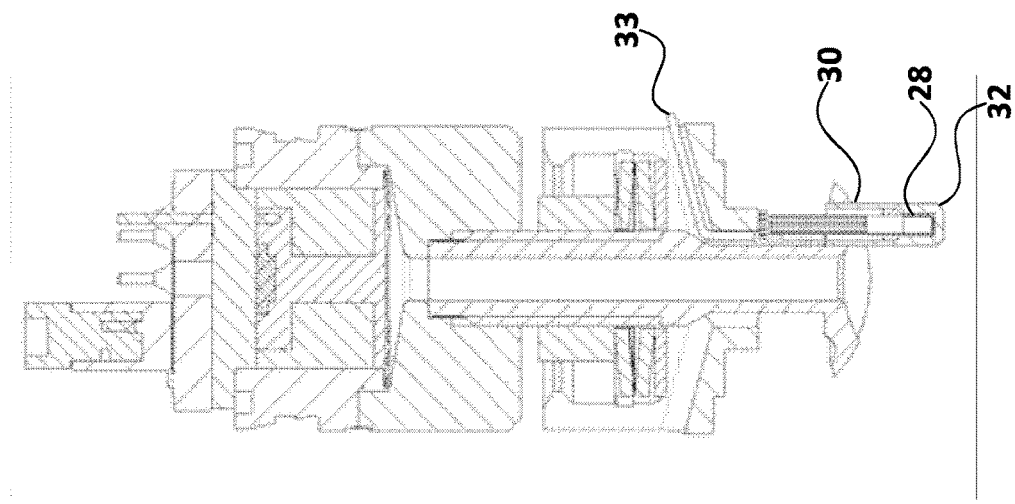
FIG. 6 shows a cross-section of an additional embodiment of the present disclosure, in which the electrode head has a second bore, through which the temperature sensor extends.

The electrode assembly (10) shown in FIG. 6 differs from the electrode assembly (10) shown in FIG. 5 by the feature that the electrode head (17) has an opening or perforation, especially a second bore (30), into which a shell, especially an immersion shell (32) is inserted, which has a temperature sensor (28) for measuring temperature of the medium.

FIGS. 4 to 6 all show, in each case, an insulating sleeve (21), which has a slot, through which the electrical connection (33) of the temperature sensor (28) extends.

The invention claimed is:

1. A magnetic-inductive flowmeter for determining a flow velocity and/or a volume flow and pressure of a medium, the flowmeter comprising:
   a measuring tube adapted to convey the medium;
   a magnetic field generating system; and
   at least one electrode assembly disposed in the measuring tube as to facilitate a galvanic contact with the medium, wherein the at least one electrode assembly comprises:
      an electrode body that is stylus-shaped and has a front end surface;
      a pressure measuring transducer coupled with the electrode body such that the pressure measuring transducer is contactable by a pressure acting on the front end surface; and
      a temperature sensor configured to determine a measurement signal dependent on a temperature of the medium.

2. The flowmeter of claim 1, wherein the pressure measuring transducer includes a measuring membrane.

3. The flowmeter of claim 1, wherein the at least one electrode body includes a first bore.

4. The flowmeter of claim 3, wherein the first bore defines a passageway forming an integrated pressure supply duct configured to convey the medium.

5. The flowmeter of claim 1, wherein the electrode body is connected terminally with a hollow body.

6. The flowmeter of claim 5, wherein a housing containing the pressure measuring transducer is connected with the hollow body by material bonding.

7. The flowmeter of claim 6, wherein the housing includes at least one contacting apparatus via which the at least one electrode assembly is electrically connected to a measuring and/or evaluation unit.

8. The flowmeter of claim 5, wherein an electrical contacting of the electrode body is implemented via the hollow body and/or a housing containing the pressure measuring transducer connected to the hollow body.

9. The flowmeter of claim 1, wherein the magnetic field generating system includes at least one coil and at least one coil core disposed in an interior of the coil, wherein the at least one coil core defines a hollow cylinder, and wherein at least one the electrode assembly is disposed within the at least one coil core.

10. The flowmeter of claim 9, wherein the at least one coil core has an interior side, and wherein insulation is disposed between the interior side and a housing containing the pressure measuring transducer connected to the hollow body.

11. The flowmeter of claim 1, wherein the electrode body includes an electrode head, wherein the electrode head has a contour.

12. The flowmeter of claim 1, wherein the electrode body comprises a fill level monitoring electrode and/or a reference electrode and/or a measuring electrode configured to sense a measurement voltage in the medium.

13. The flowmeter of claim 1, wherein the electrode body is embodied as a peg electrode, a pointed electrode or a mushroom electrode.

14. The flowmeter of claim 1, wherein the electrode body includes a first region and a second region, wherein the electrode body has in the first region a lesser thickness than in the second region, and wherein the temperature sensor is mounted in the first region on an outer surface of the electrode body.

15. The flowmeter of claim 1, wherein the temperature sensor comprises a semiconductor temperature sensor, a thermocouple, a temperature detector with quartz oscillator, a pyroelectric temperature sensor, a pyrometer or a fiber optic temperature sensor.

16. The flowmeter of claim 1, wherein the electrode head includes a rear side facing away from the measuring tube interior, at which a cavity is defined, wherein the temperature sensor is disposed in the cavity.

17. The flowmeter of claim 1, wherein the electrode head includes an opening in which a shell containing the temperature sensor is disposed.

* * * * *